United States Patent
Bosshart

(10) Patent No.: US 10,067,967 B1
(45) Date of Patent: Sep. 4, 2018

(54) HASH TABLE STORING REDUCED SEARCH KEY

(71) Applicant: Barefoot Networks, Inc., Palo Alto, CA (US)

(72) Inventor: Patrick W. Bosshart, Plano, TX (US)

(73) Assignee: BAREFOOT NETWORKS, INC., Santa Clara, CA (US)

( * ) Notice: Subject to any disclaimer, the term of this patent is extended or adjusted under 35 U.S.C. 154(b) by 285 days.

(21) Appl. No.: 15/006,151

(22) Filed: Jan. 26, 2016

Related U.S. Application Data

(60) Provisional application No. 62/108,508, filed on Jan. 27, 2015.

(51) Int. Cl.
G06F 17/30 (2006.01)

(52) U.S. Cl.
CPC .............. *G06F 17/3033* (2013.01)

(58) Field of Classification Search
CPC ....... G06F 17/3033; G06F 17/00; G06F 17/30
USPC ................................ 707/600–899
See application file for complete search history.

(56) References Cited

U.S. PATENT DOCUMENTS

| | | |
|---|---|---|
| 6,625,612 B1 | 9/2003 | Tal et al. |
| 6,754,662 B1 | 6/2004 | Li |
| 2003/0126233 A1 | 7/2003 | Bryers et al. |
| 2005/0013280 A1 | 1/2005 | Buddhikot et al. |
| 2006/0112237 A1 | 5/2006 | Chen et al. |
| 2009/0041017 A1* | 2/2009 | Luk ........... G06F 17/30949 370/392 |
| 2013/0297798 A1 | 11/2013 | Arisoylu et al. |
| 2014/0372388 A1 | 12/2014 | Attaluri et al. |
| 2014/0376555 A1 | 12/2014 | Choi et al. |
| 2015/0039823 A1 | 2/2015 | Chen |

OTHER PUBLICATIONS

Fan, Bin, et al., "Cuckoo Filter: Practically Better Than Bloom," CoNEXT'14, Dec. 2-5, 2014, 13 pages, ACM, Sydney, Australia.
Fan, Bin, et al., "MemC3: Compact and Concurrent Memcache with Dumber Caching and Smarter Hashing," NSID'13, 10th USENIX Symposium on Networked Systems Design and Implementation, Apr. 2003, 14 pages, Lombard, IL, USA.

(Continued)

*Primary Examiner* — Isaac M Woo
(74) *Attorney, Agent, or Firm* — Adeli LLP

(57) ABSTRACT

Some embodiments of the invention provide a novel hash table storage that stores smaller portions of the search keys (called reduced search keys), which, in turn allows the storage to have a smaller size and/or to store more search keys. The stored portions of search keys (i.e., the reduced search keys) can be smaller than the search keys because the hash table storage uses the non-stored portions of the search keys to ensure that one storage location cannot be used for two search keys that have the same stored portions but different non-stored portions. For instance, in some embodiments, the storage stores W minus B bits of a search key, where W is the size of the search key and B is the number of search-key bits that the storage uses to ensure that the same storage location is not identified for two search keys that have the same W-B stored bits but different B bits.

14 Claims, 8 Drawing Sheets

(56) References Cited

OTHER PUBLICATIONS

Fan, Bin, et al., "Small Cache, Big Effect: Provable Load Balancing for Randomly Partitioned Cluster Services," SOCC'11, 2nd ACM Symposium on Cloud computing, Oct. 27-28, 2011, 12 pages, ACM, Cascais, Portugal.

Fan, Bin, et al., "When Cycles are Cheap, Some Tables Can Be Huge," HotOS XIV, May 2013, 6 pages, Santa Ana Pueblo, NM, USA.

Kalia, Anuj, et al., "Using RDMA Efficiently for Key-Value Services," SIGCOMM'14, Aug. 17-22, 2014, 15 pages, ACM, Chicago, IL, USA.

Li, Xiaozhou, et al., "Algorithmic Improvements for Fast Concurrent Cuckoo Hashing," EuroSys'14, Apr. 13-16, 2014, 14 pages, ACM, Amsterdam, Netherlands.

Lim, Hyeontaek, et al., "MICA: A Holistic Approach to Fast In-Memory Key-Value Storage," NSDI'14, 11th USENIX Symposium on Networked Systems Design and Implementation, Apr. 2-4, 2014, 17 pages, USENIX Association, Seattle, WA,USA.

Lim, Hyeontaek, et al., "Practical Batch-Updatable External Hashing with Sorting," Meeting on Algorithm Engineering and Experiments (ALENEX), Jan. 2013, 10 pages, New Orleans, LA, USA.

Lim, Hyeontaek, et al., "SILT: A Memory-Efficient, High-Performance Key-Value Store," SOSP'11, 23rd ACM Symposium on Operating Systems Principles, Oct. 23-26, 2011, 13 pages, ACM, Cascais, Portugal.

Lloyd, Wyatt, et al., "Don't settle for Eventual: Scalable Causal Consistency for Wide-Area Storage with COPS," SOSP'11, 23rd ACM Symposium on Operating Systems Principles, Oct. 23-26, 2011, 16 pages, ACM, Cascais, Portugal.

Moraru, Iulian, et al., "Exact Pattern Matching with Feed-Forward Bloom Filters," ACM Journal of Experimental Algorithmics, May 2011, 19 pages, vol. 16, No. 16, Article 2.1, ACM, New York, NY, USA.

Moraru, Iulian, et al., "Fast Cache for Your Text: Accelerating Exact Pattern Matching with Feed-Forward Bloom Filters," Sep. 2009, 26 pages, School of computer Science, Carnegie Mellon University, Pittsburgh, PA, USA.

Phanishayee, Amar, et al., "Flex-KV: Enabling High-performance and Flexible KV Systems," MBDS'12, Workshop on Management of Big Data Systems, Sep. 21, 2012, 6 pages, ACM, San Jose, CA, USA.

Snoeren, Alex C., et al., "Fine-Grained Failover Using Connection Migration," 3rd USENIX Symposium on Internet Technologies and Systems, Mar. 26-28, 2001, 12 pages, USENIX Association, San Francisco, CA.

Vasudevan, Vijay, et al., "Using Vector Interfaces to Deliver Millions of IOPS from a Networked Key-value Storage Server," SOCC'12, 3rd ACM Symposium on Cloud Computing, Oct. 14-17, 2012, 13 pages, ACM, San Jose, CA USA.

Zhou, Dong, et al., "Scalable, High Performance Ethernet Forwarding with CuckooSwitch," CoNEXT, 9th International Conference on emerging Networking Experiments and Technologies, Dec. 9-12, 2013, 12 pages, ACM, Santa Barbara, CA, USA.

\* cited by examiner

HASH TABLE STORING REDUCED SEARCH KEY

BACKGROUND

Hash table storages are commonly used to store and retrieve data in many applications today. From a search data input, a hash table storage generates a hash index that identifies the location in a hash table that stores a search key. The hash table storage compares the input search data with the search key to determine whether they match. If these two values match, the storage returns the address at which the data is found. This address is called the hit address. Alternatively, the hash table storage can return lookup data associated with the search data input, by accessing a memory storing the payload data, using the hit address.

The size of hash table memories is proportional to the size of the search keys that they store. As such, the number of records that hash table memories can store is inversely proportional to the size of the stored search keys.

SUMMARY

Some embodiments of the invention provide a novel hash table storage that stores smaller portions of the search keys, which, in turn allows the storage to have a smaller size and/or to store more search keys. The stored portions of search keys (called reduced search keys, or RSKs) can be smaller than the search keys because the hash table storage uses the non-stored portions of the search keys to ensure that one storage location cannot be used for two search keys that have the same stored portions but different non-stored portions. For instance, in some embodiments, the storage stores W minus B bits of a search key, where W is the size of the search key and B is the number of search-key bits that the storage uses to ensure that the same storage location is not identified for two search keys that have the same W-B stored bits but different B bits.

In some embodiments, the hash table storage includes (1) a memory for storing reduced search keys, and (2) a hash generator for generating addresses of locations in the memory for storing the reduced search keys. To identify a location in the memory for storing a reduced search key, the hash generator produces a hash address that is defined at least in part by a collision-free hash of the B bits, which are used to ensure that the same storage location is not addressed by two search keys that have the same W-B stored bits but different B bits. The hash address in some embodiments is also defined in part by a hash of the W-B stored bits. In some embodiments, the hash of the W-B stored bits is not a collision free hash.

In some embodiments, the hash generator uses two different hash sub-generators, a first collision-free hash sub-generator for generating a first hash value from the B bits, and a second hash sub-generator for generating a second hash value from the W-B bits. The hash generator then combines the first and second hash values to produce the final hash address value, which identifies a memory location for storing or retrieving a reduced search key. Different embodiments use different techniques for combining the first and second hash values. For instance, some embodiments concatenate these values, while other embodiments use a Boolean operator (e.g., AND, XOR, etc.) to combine these values. As the first hash value is collision free with respect to B of the W bits of the search key, the combined hash value is also free of collisions with respect to these B bits.

Instead of using two different hash sub-generators to generate a hash of the W-bit search key, some embodiments use just one hash generator to generate a hash value of the W-bit search key. This hash generator, however, ensures the collision-free nature of the sub-component of the generated hash value that is produced for the B bits of the search key. For instance, the hash generator in some embodiments includes a field matrix multiplier that uses a field matrix with a linearly independent B-by-B sub-matrix. For W search input bits and B hash output bits, the field matrix in some embodiments has W rows and B columns of bit values (e.g., 1's and 0's). For a W-bit search key, the field matrix multiplier produces the B hash output bits by multiplying each search key bit with each bit in a particular row of the matrix and then combining (e.g., XOR'ing, etc.) the bits in each column that result from the multiplication.

In some embodiments, the field matrix is a Galois field matrix. In this matrix, each column of the matrix represents a parity mask for that column's hash output bit. In some embodiments, the parity mask for each hash output bit will be different, as it is determined by a different column of the matrix. After multiplying each search key bit with the bits in the matrix row that corresponds to the search key bit, the Galois field multiplier combines the resulting-multiplication bits through an XOR operation.

To ensure that the hash generated through the matrix field multiplication is collision free with respect to B of the W search key bits, the B×B sub-matrix of the field multiplier matrix needs to be linearly independent. To create such a sub-matrix, any B rows can be chosen for B columns of the matrix. The contents of this sub-matrix are linearly independent if no row of the matrix can be created as a linear combination of any other rows. In case of Galois field matrix, combination is done using the XOR operator. For example, the three rows 001 010 and 011 are not linearly independent, because the third can be made as the XOR of the first two. Essentially, linear independence ensures that all B dimensions of the search keys are used to identify a unique address location when the W-B bits of the search key are identical among different search keys.

In some embodiments, the hash table memory (also called the hash table) is a B-bit addressable memory that has $2^B$ bits of storage locations. As mentioned above, the hash generator ensures the collision free nature of the component of the hash value that is due to the B bits of the search key. Thus, the hash generator can store the same reduced search key up to $2^B$ times when it receives $2^B$ search keys that have the same W-B bits but have $2^B$ different combinations of B bit values. In other words, the hash generator uses the $2^B$ unique locations of the B-bit addressable memory to perform the equality check operation for the B-bits of the search keys. As such, the hash table does not need to store the B bit values of the search key because to the extent that the B bits are needed to differentiate one search key from another, these B bits are used to ensure that the hash table stores the two search keys in different locations. Hence, storing the B-bits of the search keys would be redundant, as no two different search keys that have the same W-B bits will ever hash to the same storage location, because of the collision free nature of the hashing of the B bits.

In some embodiments, each location in the hash memory stores more than W-B bits. For instance, in addition to the W-B reduced search key bits, each location in the hash memory in some embodiments stores one or more other bits, such a validity bit, error detection bits, error correction bits, etc. In some embodiments, each memory location stores W-B+1 bits, where the extra bit is a validity bit that specifies whether the reduced search key tuple is still valid.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel hash table storage that stores smaller portions of the search keys, which, in turn allows the storage to have a smaller size and/or to store more search keys. The stored portions of search keys (called the reduced search keys) can be smaller than the search keys because the hash table storage uses the non-stored portions of the search keys to ensure that one storage location cannot be used for two search keys that have the same stored portions but different non-stored portions. For instance, in some embodiments, the storage stores W minus B bits of a search key, where W is the size of the search key and B is the number of search-key bits that the storage uses to ensure that the same storage location is not identified for two search keys that have the same W-B stored bits but different B bits.

Figure 1:
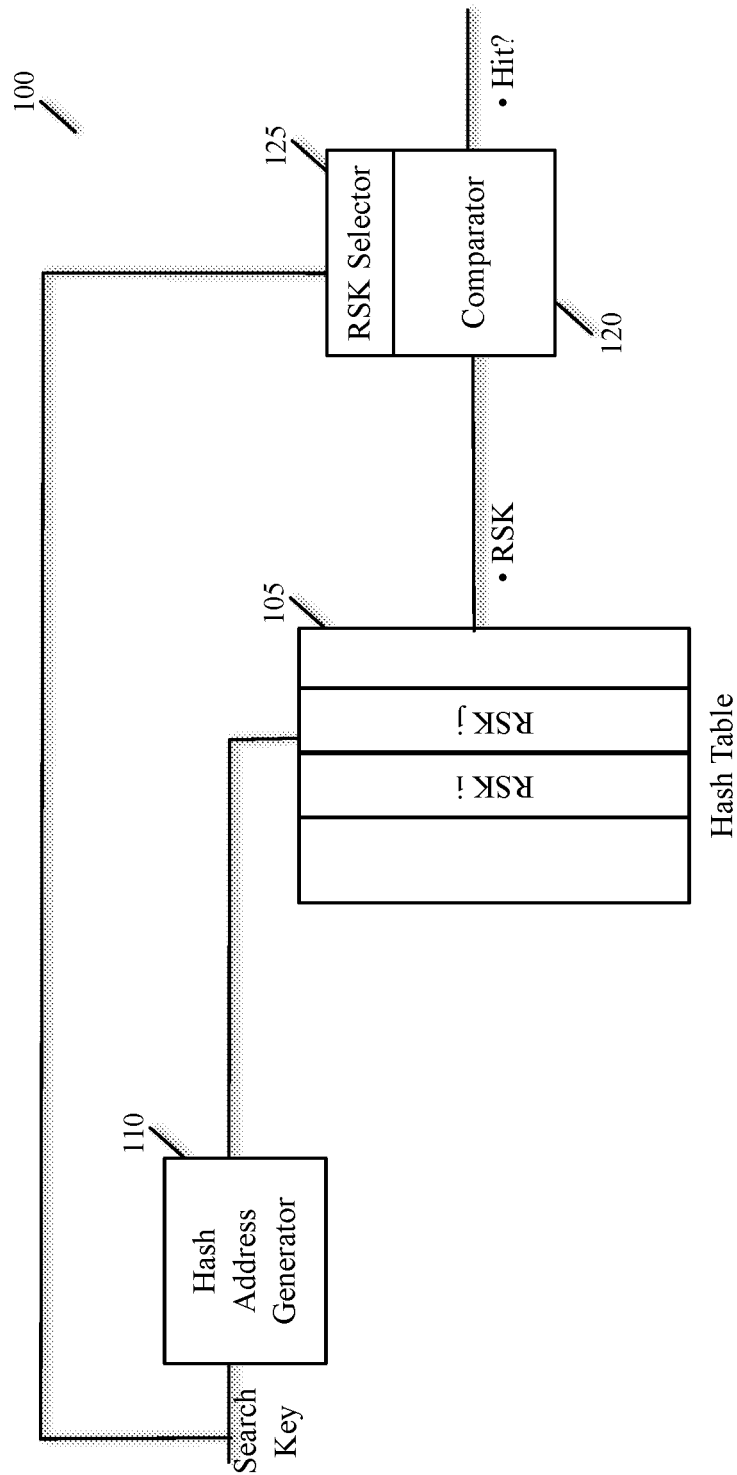
FIG. 1 illustrates the hash table storage 100 of some embodiments of the invention.

FIG. 1 illustrates the hash table storage 100 of some embodiments of the invention. As shown, this storage includes a memory 105, a hash generator 110 and a comparator 120. The memory 105 stores multiple reduced search keys (RSKs) in multiple addressable locations. The hash generator 110 (1) receives a search key, and (2) from this search key, generates an address of a location in the memory 105 that stores a reduced search key. Upon receiving this address, the memory 105 outputs the reduced search key that is stored at the addressed location to the comparator.

As shown, the comparator 120 also receives the search key. The comparator has an RSK selector 125 to select a smaller portion of the search key. The selected portion corresponds to the search key portions that are stored in the memory 105. For instance, when the search key has 48 bits, and the stored RSK bits are bits 1-38, the RSK selector 125 selects bits 1-38 of the search key that is supplied to the comparator.

The comparator compares the RSK output by the memory 105 with the RSK produced by the RSK selector 125 to determine whether these two values match. In some embodiments, the comparator determines that the two values match when these two values are identical. In other embodiments, the comparator determines that the two values match when these two RSKs have a particular relationship with each other (e.g., one is an inverted version of the other, one is a transformed version of the other, etc.).

When the comparator determines that the two RSKs do not match, there is a hash table miss (i.e., the hash table storage does not store a record for the received search key), and the comparator outputs a hash table MISS signal. On the other hand, there is a hash table hit (i.e., the hash table storage has a record for the received search key) when the comparator determines that the two RSK values match. In case of a hash table hit, the comparator outputs different values in different embodiments. For instance, in case of a hash table hit, the comparator (1) outputs just a HIT signal in some embodiments, (2) output a HIT signal and the address (called the hit address) of the location that stored the matching RSK in other embodiments, or (3) output payload data that the memory 105 stores with the matching RSK in still other embodiments.

In some of the embodiments that have the comparator just output the HIT signal, the hash generator 110 or another hash generator is used to generate an address to a location in another memory that stores the payload that is associated with the matching RSK. In some embodiments that have the comparator output the hit address, the hit address is used to retrieve payload data that is associated with the matching RSK. In some embodiments, the comparator does not output a HIT signal with the hit address, as the HIT signal is implicit in the hit address that is supplied by the comparator.

For a received W-bit search key, the hash generator 110 of some embodiments produces a hash address that identifies the location in the memory 105 that stores a reduced search key of W-B bits. This hash address is defined at least in part by a collision-free hash of the B bits that are used to ensure that the same storage location is not addressed by two search keys that have the same W-B stored bits but different B bits. The hash address in some embodiments is also defined in part by a hash of the W-B stored bits. In some embodiments, the hash of the W-B stored bits is not a collision-free hash.

Figure 2:
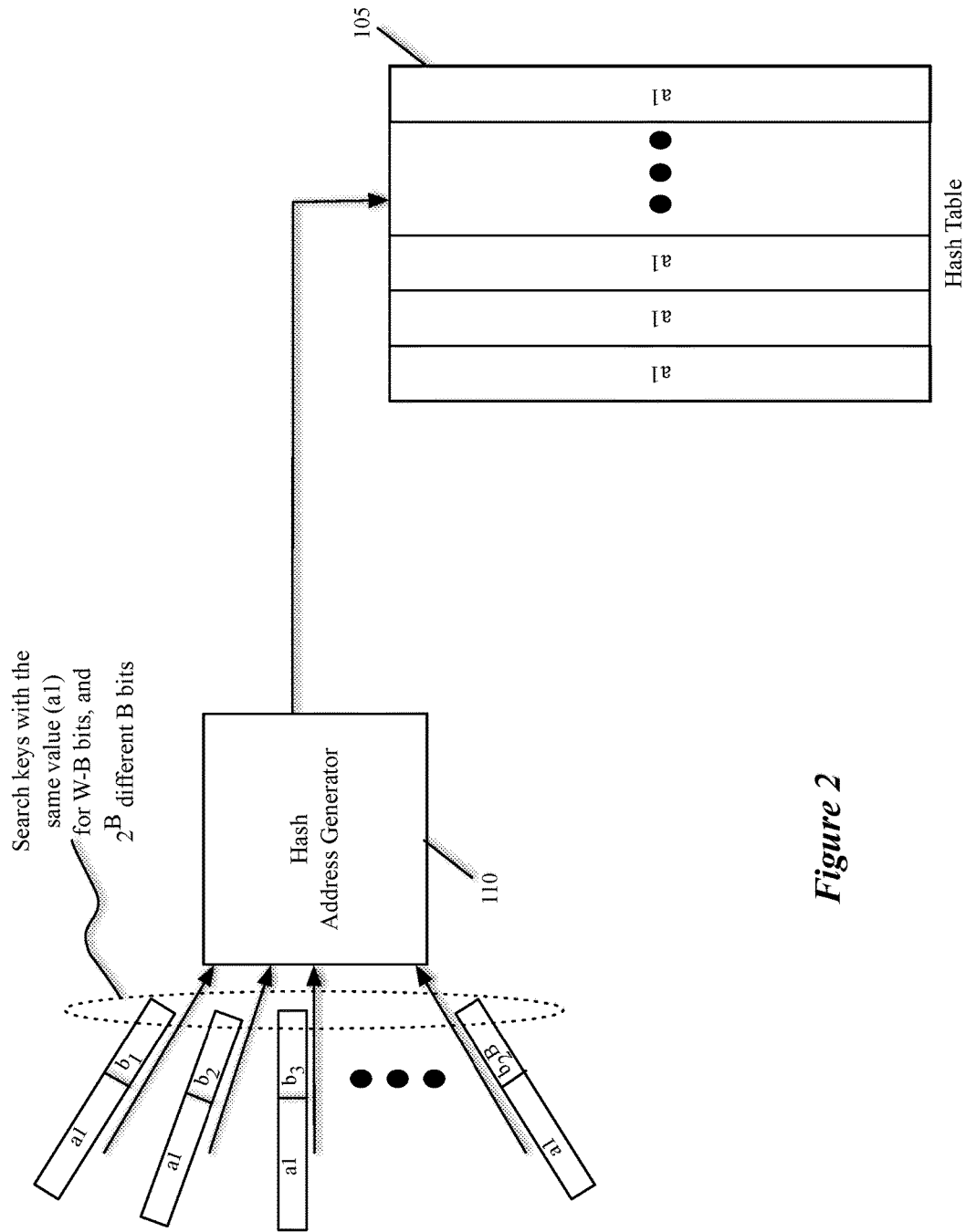
FIG. 2 illustrates a B-bit addressable hash table storing the same reduced search key in $2^B$ storage locations.

In some embodiments, the hash memory 105 is a B-bit addressable memory that has $2^B$ bits of storage locations. Because the hash generator ensures the collision free nature of the component of the hash address that is due to the B bits of the search key, the hash memory 105 can store the same reduced search key up to $2^B$ times when it receives $2^B$ search keys that have the same W-B bits but have $2^B$ different combinations of B bit values. This is illustrated in FIG. 2. Specifically, this figure shows the memory storing the value "a1" as a RSK in $2^B$ storage locations of a B-bit addressable memory 205, because the hash generator receives $2^B$ search keys that have the same W-B bits (which, in this example, is the value a1) but have $2^B$ different combinations of B bit values.

In this manner, the hash generator 110 uses the $2^B$ unique locations of the B-bit addressable memory to perform the equality check operation for the B-bits of the search keys. As such, the hash table does not need to store the B bit values of the search key because to the extent that the B bits are needed to differentiate one search key from another, these B bits are used to ensure that the hash table stores the two search keys in different locations. Hence, storing the B-bits of the search keys would be redundant, as no two different search keys that have the same W-B bits will ever hash to the same storage location, because of the collision free nature of the hashing of the B bits.

In some embodiments, each location in the hash memory stores more than W-B bits. For instance, in addition to the W-B reduced search key bits, each location in the hash memory in some embodiments stores one or more other bits, such a validity bit, error detection bits, error correction bits, etc. In some embodiments, each memory location stores W-B+1 bits, where the extra bit is a validity bit that specifies whether the reduced search key tuple is still valid.

Figure 3:
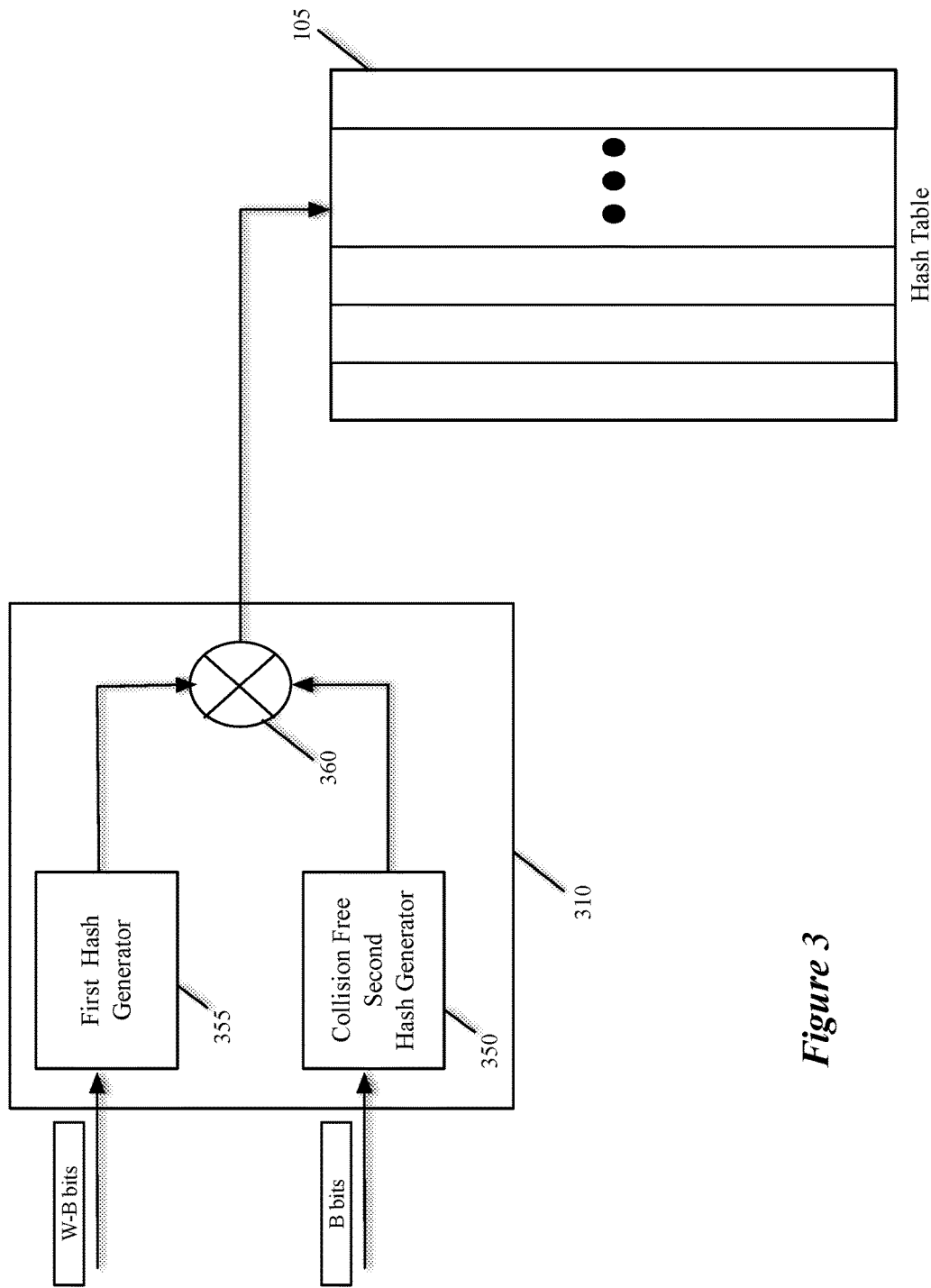
FIGS. 3 and 4 illustrate two different hash generators of some embodiments of the invention.

Different embodiments use different techniques to generate a hash address from a search key. FIG. 3 illustrates one example of a hash generator 310 of some embodiments of the invention. As shown, this hash generator 310 uses two different hash sub-generators, a first collision-free hash sub-generator 350 for generating a first hash value from B bits of a W-bit search key, and a second hash sub-generator 355 for generating a second hash value from the W-B bits of the search key. A collision free hash generator produces a collision free hash of B bits because each hash that it produces maps to one and only one set of B bits. In other words, the hash of the B bits is reversible.

As shown in FIG. 3, the hash generator includes a mixer 360 that combines the first and second hash values to produce the final hash address value, which identifies a memory location in the memory 105 for storing or retrieving a reduced search key. Different embodiments use different techniques for combining the first and second hash values. For instance, in some embodiments, the mixer 360 concatenates the first and second hash values, while in other embodiments, the mixer uses a Boolean operator (e.g., AND, XOR, etc.) to combine these values (e.g., XORs the first and second hash values). As the first hash value is collision free with respect to B of the W bits of the search key, the combined hash value is also free of collisions with respect to these B bits.

Instead of using two different hash sub-generators to generate a hash of the W-bit search key, some embodiments use just one hash generator to generate a hash value of the W bit search key. This hash generator, however, ensures the collision-free nature of the sub-component of the generated hash value that is produced for the B bits of the search key. In other words, the hash operation is defined so that the B hash output bits are linearly independent over the B input bits which have been eliminated.

Figure 4:
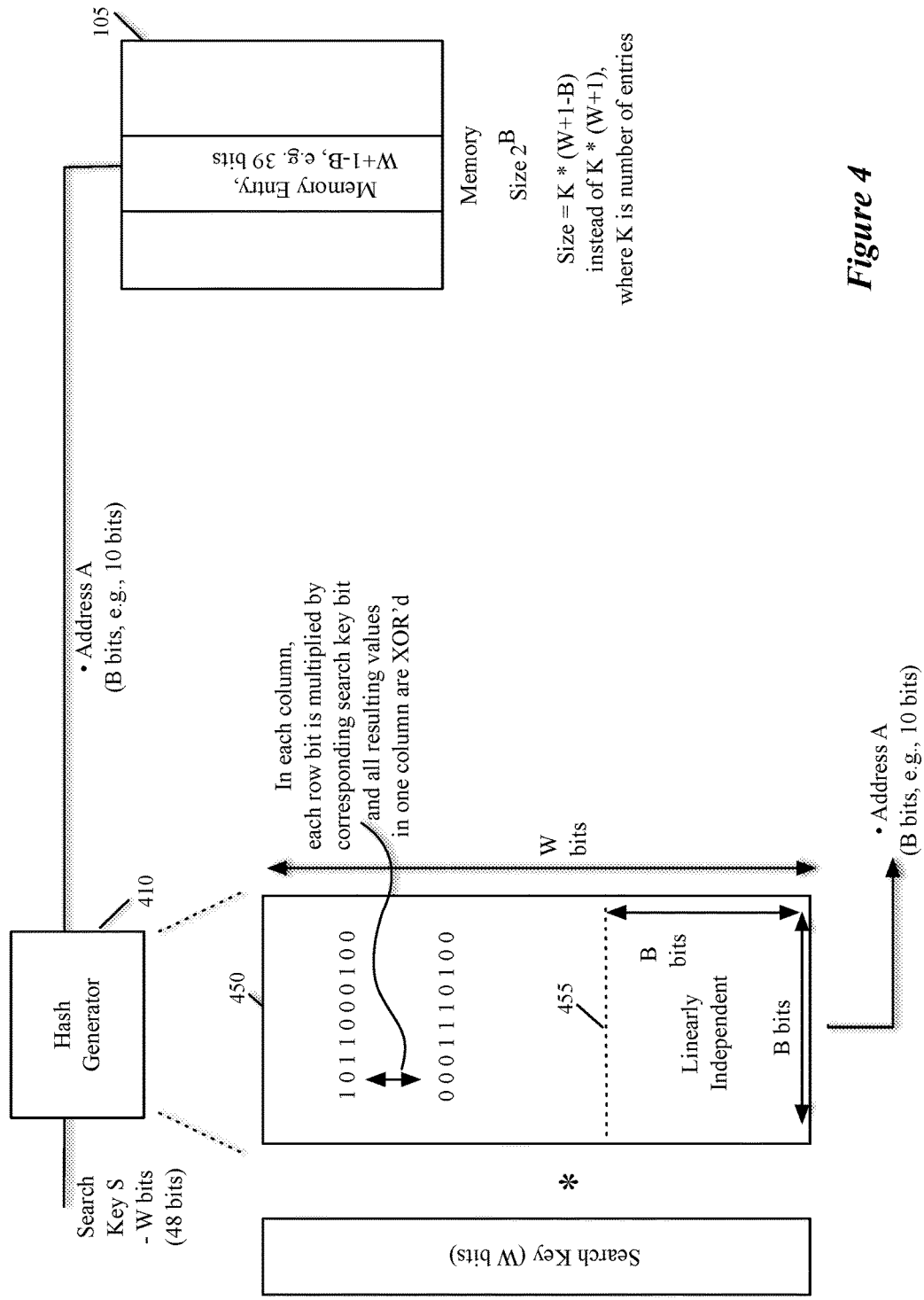

FIG. 4 illustrates an example of one such hash generator 410 of some embodiments of the invention. This hash generator is a field matrix multiplier that uses a field matrix 450 with a linearly independent B-by-B sub-matrix 455. For W search input bits and B hash output bits, the field matrix in some embodiments has W rows and B columns of bit values (e.g., 1's and 0's). For a W-bit search key, the field matrix multiplier produces the B hash output bits by multiplying each search key bit with each bit in a particular row of the matrix and then combining (e.g., XOR'ing, etc.) the bits in each column that result from the multiplication.

In some embodiments, the field matrix is a Galois field matrix. In this matrix, each column of the matrix represents a parity mask for that column's hash output bit. In some embodiments, the parity mask for each hash output bit will be different, as it is determined by a different column of the matrix. After multiplying each search key bit with the bits in the matrix row that corresponds to the search key bit, the Galois field multiplier combines the resulting-multiplication bits through an XOR operation.

To ensure that the hash generated through the matrix field multiplication is collision free with respect to B of the W search key bits, the B×B sub-matrix of the field multiplier matrix needs to be linearly independent. To create such a sub-matrix, any B rows can be chosen for B columns of the matrix. The contents of this sub-matrix are linearly independent if no row of the matrix can be created as a linear combination of any other rows. In case of Galois field matrix, combination is done using XOR. For example, the three rows 001 010 and 011 are not linearly independent, because the third can be made as the XOR of the first two. Essentially, linear independence ensures that all B dimensions of the search keys are used to identify a unique address location when the W-B bits of the search key are identical among different search keys.

As shown in FIG. 4, the K entries in the hash memory 105 are each W-B+1 bits, where the added bit is a validity bit that specifies whether the entry is valid. As further shown, eliminating B bits from the stored search key entries in the hash memory 105 reduces the amount of memory that the K entries take in this memory from K times W+1 bits, to K times W-B+1 bits. For instance, for a 48 (W) bit search key, and a 10-bit (B-bit) addressable hash memory 105, the size of the memory entries can go from 49 bits to 39 bits.

Given that the cost of the hash table storage is directly proportional to the number of bits required in the hash table (as the number of bits determines the amount of integrated circuit wafer area required to implement the hash table), reducing the size of the hash table entries reduces the cost of the hash table storage. Alternatively, or conjunctively, the reduced size of the hash memory records allows the hash table storage to store additional entries.

Figure 5:
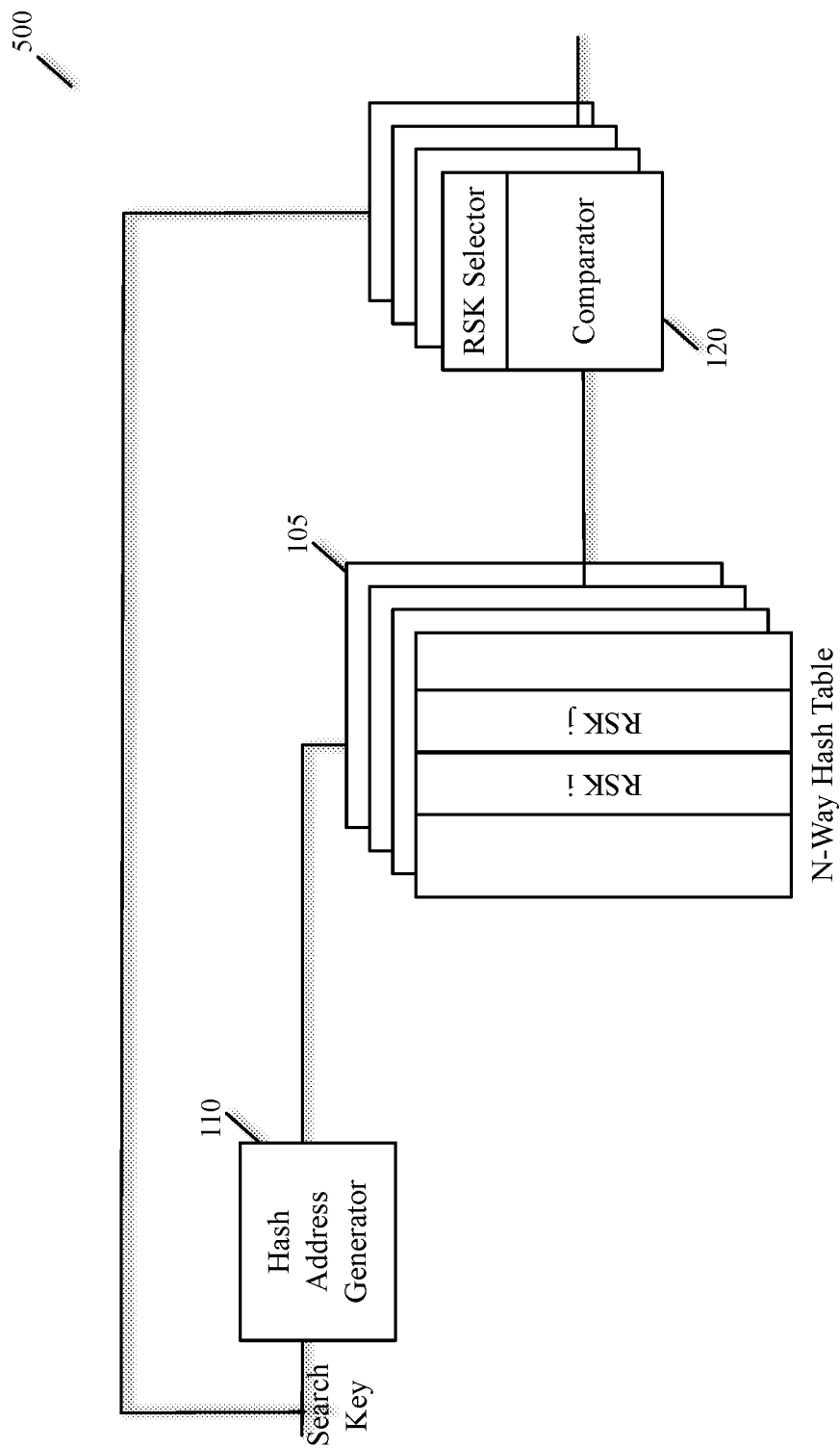
FIG. 5 illustrates an N-way hash table storage of some embodiments.

Some embodiments use hash table storages that are more complex than those illustrated in FIGS. 1-4. For instance, in some embodiments, the hash table storage is an N-way hash table storage that has N sub-tables (i.e., N hash memories) that can concurrently be accessed by one search key. FIG. 5 illustrates an example of one such N-way hash table storage 500. This hash table storage 500 is similar to the hash table storage 100 except that it has N hash memories 105 and N comparators 120. In the illustrated example, N equals four, but one of ordinary skill will realize that other number of hash memories and comparators can be used in some embodiments of the invention.

In some embodiments, the hash generator 110 generates the same address value for each of the N hash memories 105. In other embodiments, the hash generator 110 generates four different address values for the four hash memories 105. In some of these embodiments, the hash generator 110 includes N different hash sub-generators, one to generate an address for each memory 105 based on the received search key.

In the hash storage 500, each hash memory outputs an RSK from the memory location that is identified by the address that the hash memory receives from the hash generator 110. Each comparator 120 compares a different one of the RSKs output by a different hash memory 105 with the RSK that the RSK selector 125 extracts for the search key. When no output RSK matches the RSK extracted from the search key, all the comparators output a hash table MISS. On the other hand, when one of the output RSKs matches the RSK extracted from the search key, the comparator that matched the two values, (1) outputs just a HIT signal in some embodiments, (2) outputs a HIT signal and the address (called the hit address) of the location that stored the matching RSK in other embodiments, or (3) outputs payload data that the memory 105 with the matching RSK stores with the RSK in still other embodiments. The hash table storage in some embodiments is even more complex than the hash table storage 500 of FIG. 5. For instance, in some embodiments, the hash table storage has multiple N-way hash table storages (e.g., multiple 4-way hash tables).

Figure 6:
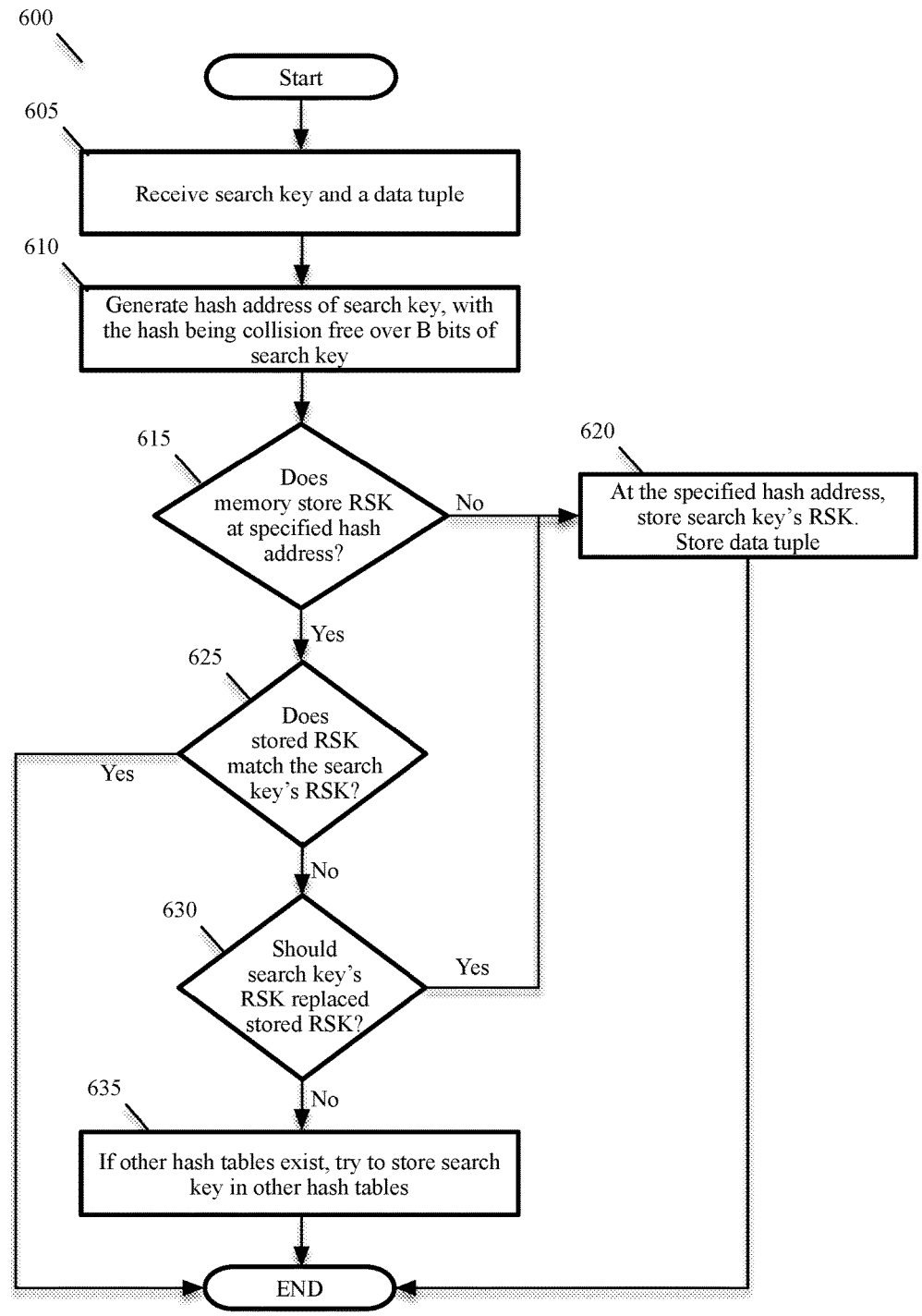
FIG. 6 conceptually illustrates a process that the hash table storage of some embodiments uses to store a reduced search key for a received search key.

FIG. 6 conceptually illustrates a process 600 that the hash table storage of some embodiments uses to store a reduced search key for a received search key. In some embodiments, the hash table storage is used in a data plane of a forwarding element, and this storage performs the process 600 at the direction of a control plane process of forwarding element. In some embodiments, the control plane process initiates the process 600 after the hash table storage returns a hash table MISS for a search key. In other embodiments, the process 600 is performed in response to different conditions in a forwarding element or another type of an electronic device.

As shown, the process 600 initially receives (at 605) a W-bit search key and a data tuple to store for the search key. The process 600 then generates (at 610) a hash address for the search key. This hash address is collision free over B bits of the search key. Several examples of generating such a hash address were described above by reference to FIGS. 3 and 4. Next, at 615, the process examines a hash table (i.e., a memory 105) within the storage to determine whether this table stores a valid RSK at the hash address generated at 610.

When the table does not store a valid RSK at the generated hash address, the process stores (at 620) at the generated address in the hash table (i.e., in the memory 105), an RSK that is extracted from the received search key. This RSK includes the W-B bits of the search key. At 620, the process also stores the data tuple that was received with the search key at 605. In some embodiments, the data tuple is stored with the stored RSK in the hash table, as the payload that is to be returned when the stored RSK matches the RSK of a received search key. In other embodiments, the data tuple is stored in another memory of the hash table storage. The data tuple is stored in this other memory at the address generated at 610, or at another address that is produced from the search key, such that the data tuple can later be retrieved from this other memory when (1) the stored RSK matches the RSK of a received search key, and (2) the address of the memory location that stores this data tuple is generated from the received search key. After 620, the process ends.

When the process determines (at 615) that the examined table does store a valid RSK at the generated hash address, the process determines (at 625) whether the stored RSK matches an RSK extracted from the search key. For instance, when the RSKs are the W-B bits of the search keys, the process compares the stored RSK with the W-B bits of the received search key to determine whether these two sets of bits match. When they match, the process ends. Instead of just ending when the stored RSK matches the extracted RSK, the process 600 determines whether the data tuple that is stored with the RSK should be updated, and if so, updates this data tuple before ending.

Otherwise, when the stored RSK does not match the extracted RSK, the process transitions from 625 to 630. In some embodiments, the process 600 does not perform the operation at 625, because the process 600 was initiated after the hash table storage returned a hash table MISS for the search key. Hence, in these embodiments, it would not be necessary to determine whether the stored RSK matched the search key's RSK because a determination was already made that the search key's RSK is not stored in the hash table storage.

At 630, the process determines whether the received search key's RSK should replace the RSK currently stored at the hash address generated at 610. If so, the process transitions to 620 to store the search key's RSK and its associated data tuple, as described above. Otherwise, the process transitions from 630 to 635. In some embodiments, the process 600 does not perform the determination at 630, because so long as the stored RSK is valid (as determined at 615), the process does not replace one valid stored RSK with a new RSK. In other embodiments, the process 600 performs the operation at 630, because it can replace a stored valid RSK under some circumstances.

If the hash table storage has multiple hash tables (i.e., multiple hash memories), the process tries (at 635) to store the RSK for the received search key in one of these other hash tables. In some embodiments, the storage has other hash tables as it has one N-way hash table or multiple N-way hash tables. The process tries (at 635) to store the search key's RSK in these other hash tables, by performing some or all of the operations 610-630 for these other hash tables. When the process stores the RSK for the received search key in one of the other hash tables, the process also stores the search key's associated data tuple in the hash table, or in another memory of the hash table storage, as described above. After 635, the process ends.

Figure 7:
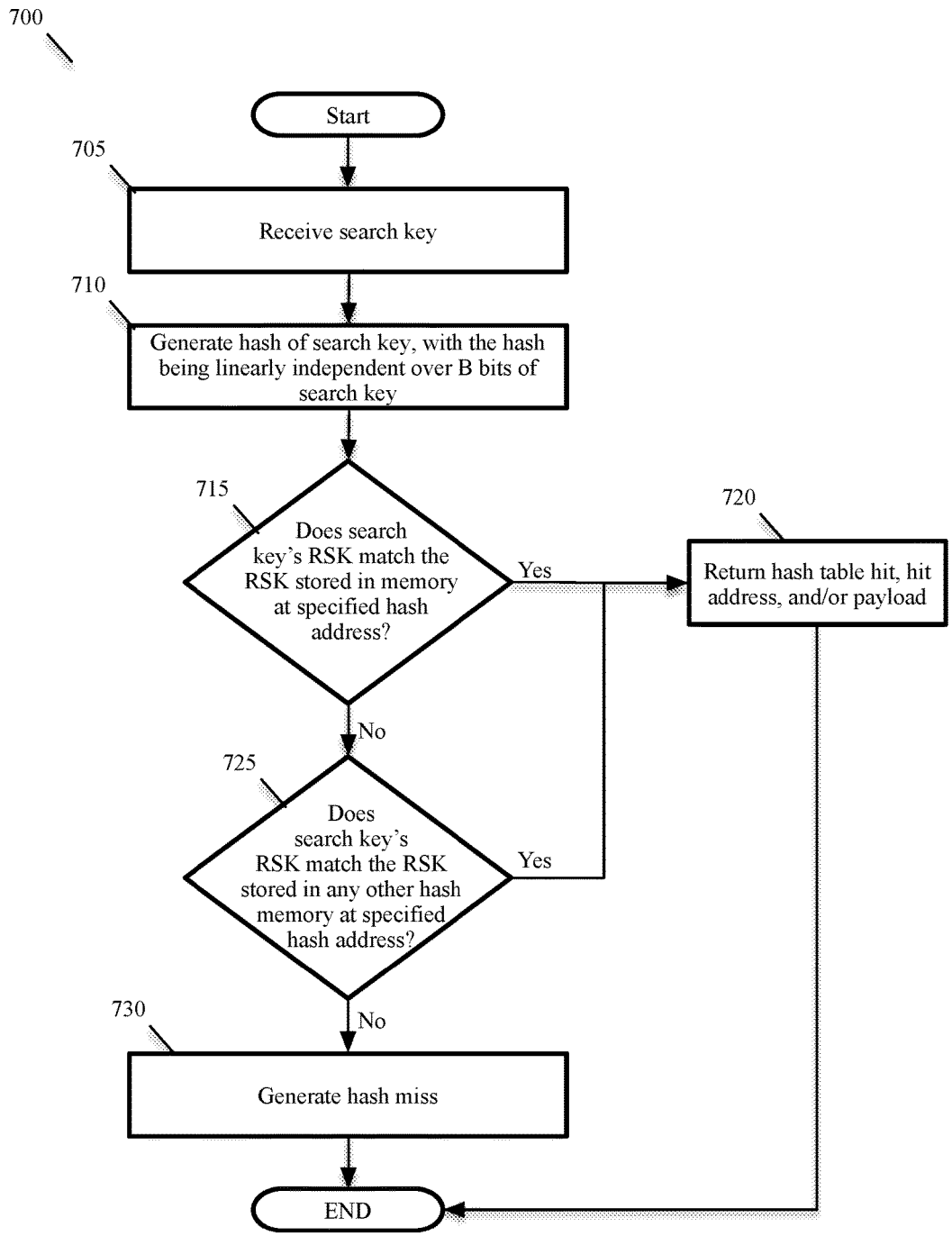
FIG. 7 conceptually illustrates a process that the hash table storage of some embodiments uses to try to retrieve a data tuple that it may store for a received search key.

FIG. 7 conceptually illustrates a process 700 that the hash table storage of some embodiments uses to try to retrieve a data tuple that it may store for a received search key. In some embodiments, the hash table storage is used in a data plane of a forwarding element, and this storage perform the process 700 at the direction of another data plane process (e.g., a packet processor) of forwarding element. In other embodiments, the process 700 is performed in another type of electronic device.

As shown, the process 700 initially receives (at 705) a W-bit search key. The process 700 then generates (at 710) a hash address for the search key. This hash address is collision free over B bits of the search key. Several examples of generating such a hash address were described above by reference to FIGS. 3 and 4. Next, at 715, the process determines whether a hash table (i.e., a memory 105) within the storage stores at the generated hash address an RSK that matches an RSK that is extracted from the received search key. As mentioned above, the comparator 120 performs this determination in some embodiments by determining whether the RSK that is output from the hash memory location at the generated hash address, matches the RSK that the RSK selector 125 extracts from the received search key.

When the process determines (at 715) that the output and extracted RSKs match, the process outputs (at 720) (1) a HIT signal in some embodiments, (2) a HIT signal and the hit address of the location that stored the matching RSK in other embodiments, or (3) payload data that the memory 105 stores with the matching RSK in still other embodiments, as described above. After 720, the process ends.

When the process determines (at 715) that the output and extracted RSKs do not match, the process determines (at 725) whether the search key's RSK matches the RSK stored in any other hash table (i.e., in another hash memory) of the hash table storage. For this determination, the process examines any other hash table at the hash address generated at 710, or a hash address that a hash generator generates for the other hash table from the received search key.

When no other hash table stores a matching RSK value, the process returns (at 730) a hash MISS and then ends. Otherwise, the process transitions to 720 in order to output (1) a HIT signal in some embodiments, (2) a HIT signal and the hit address of the location that stored the matching RSK in other embodiments, or (3) payload data that is stored with the matching RSK in still other embodiments. When the hash table storage only has one hash table, the process 700 does not perform the operation 725, and instead transitions from 715 to 730.

Figure 8:
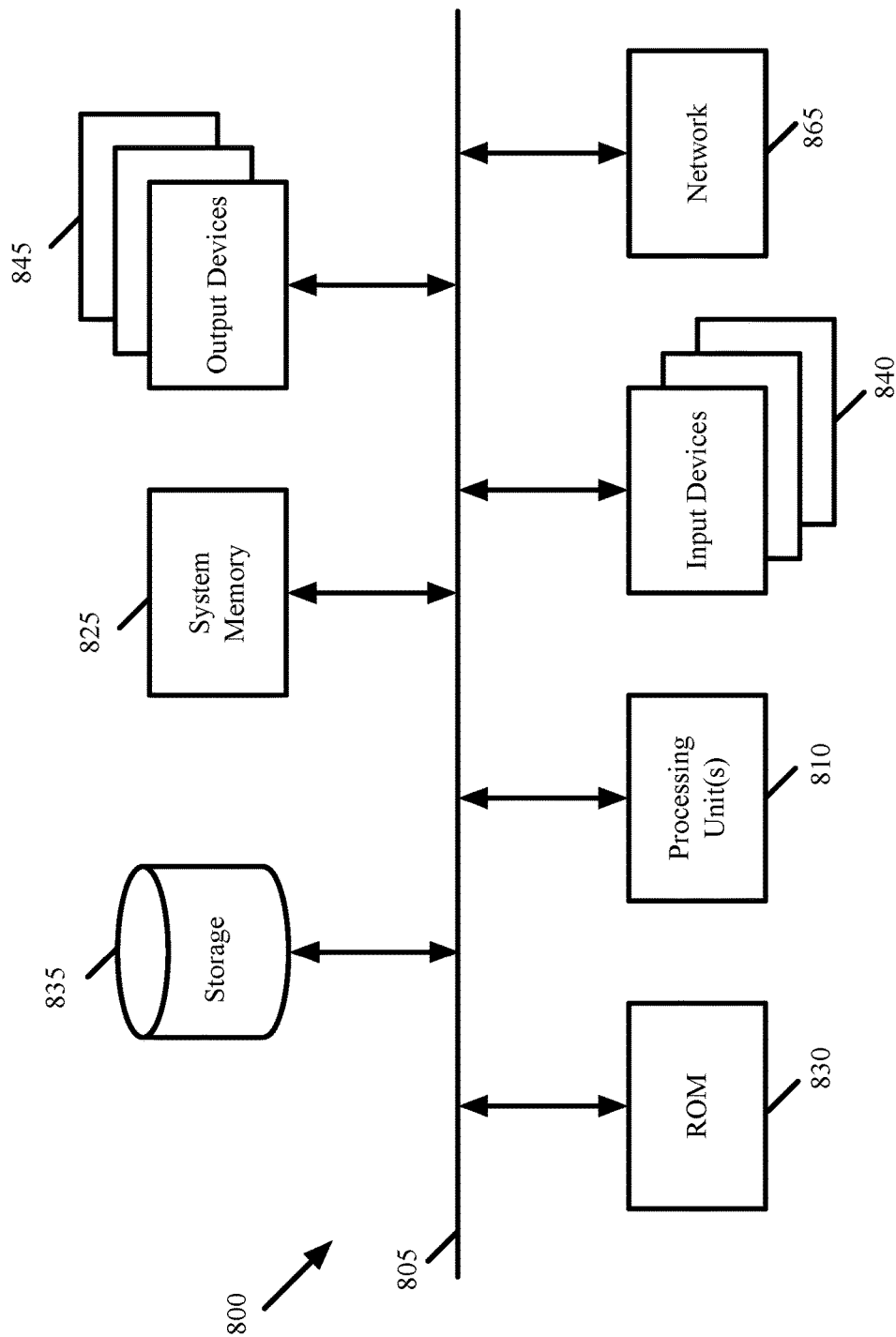
FIG. 8 illustrates an electronic system of some embodiments of the invention.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), or any other sort of electronic device. As shown, the electronic system includes various types of computer readable media and interfaces for various other types of computer readable media. Specifically, the electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835. From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer or electronic device. These terms exclude any wireless signals, wired download signals, and any other ephemeral or transitory signals.

While the invention has been described with reference to numerous specific details, one of ordinary skill in the art will recognize that the invention can be embodied in other

What is claimed is:

1. For hash table that stores a plurality of W-B bit reduced search keys (RSKs) that are associated with a plurality of W-bit search keys, a method of processing a particular search key, the method comprising
generating a B-bit hash address value from the particular search key by using a field matrix that produces a B-bit address value for a W-bit search key, wherein the field matrix comprises a B-by-B sub-matrix that has B linearly independent rows;
outputting an RSK that is stored in the hash table at the generated hash address value, each RSK having a smaller size than the RSK's associated search key, wherein (i) the hash table is a B-bit addressable memory that can store $2^B$ possible RSKs, (ii) each possible B-bit value translates to only one of the $2^B$ possible values, and (iii) each one of the $2^B$ possible values translates to only one possible B-bit value;
comparing the output RSK with an RSK that is extracted from the particular search key to determine whether the two RSKs match; and
when the two RSKs match, outputting data to indicate that the hash table has a record related to the particular search key.

2. The method of claim 1,
wherein the generated hash address value is collision free over B bits of each W-bit search key.

3. The method of claim 1, wherein with each RSK, the hash table stores a set of other bits.

4. The method of claim 3, wherein the set of other bits includes one validity bit that specifies whether the RSK is valid.

5. The method of claim 3, wherein the set of other bits includes payload data.

6. The method of claim 1, wherein the outputted data includes an address in a memory that stores a data tuple that is associated with the outputted RSK.

7. The method of claim 6, wherein the outputted data further includes a hash table hit value.

8. The method of claim 1, wherein the outputted data includes a data tuple that the hash table stores for the outputted RSK.

9. The method of claim 1 further comprising retrieving from a memory a data tuple that is stored at the generated address when the outputted data is a hash table hit value.

10. The method of claim 1 further comprising:
when the outputted data is a hash table hit value,
generating another address value from the particular search key;
retrieving from a memory a data tuple that is stored at the other generated address value.

11. The method of claim 1 further comprising when the two RSKs do not match, outputting a hash table miss value.

12. A hash table storage comprising:
a hash generator for producing address values from search keys, wherein (i) the hash generator comprises a field matrix that produces a B-bit address value for a W-bit search key and (ii) the field matrix comprises a B-by-B sub-matrix that has B linearly independent rows; and
a hash memory for (i) storing a plurality of reduced search keys (RSKs) at a plurality of locations that are identifiable based on a plurality of address values, and (ii) outputting a particular RSK for a particular address value that the hash generator produces for a particular search key, each RSK having a smaller size than each search key, wherein the hash memory is a B-bit addressable memory that can store $2^B$ possible RSKs, each possible B-bit value translates to only one of the $2^B$ possible values, and each one of the $2^B$ possible values translates to only one possible B-bit value; and
a comparator for comparing the particular RSK with an RSK that is extracted from the particular search key to determine whether the two RSKs match;
when the two RSKs match, the comparator outputting data to indicate that the hash memory has a record related to the particular search key.

13. The hash table storage of claim 12 further comprising a second memory for (i) storing a plurality of data tuples for the plurality of reduced search keys stored in the first memory and (ii) outputting a particular data tuple for the particular reduced search key that the first memory outputs when the reduced search matches a corresponding portion of the particular search key.

14. The hash table storage of claim 12, wherein
each address value is B bits,
each search key is W bits, and
each reduced search key is W-B bits.

* * * * *